US 8,245,029 B2

(12) United States Patent
Chen et al.

(10) Patent No.: US 8,245,029 B2
(45) Date of Patent: Aug. 14, 2012

(54) SYSTEM AND METHOD FOR ENHANCED NETWORK ENTRANCE INTO A WIRELESS NETWORK

(75) Inventors: Wei-Peng Chen, Santa Clara, CA (US); Chenxi Zhu, Gaithersburg, MD (US); Jonathan R. Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 12/533,405

(22) Filed: Jul. 31, 2009

(65) Prior Publication Data
US 2010/0115265 A1 May 6, 2010

Related U.S. Application Data

(60) Provisional application No. 61/110,272, filed on Oct. 31, 2008, provisional application No. 61/222,795, filed on Jul. 2, 2009.

(51) Int. Cl.
*H04L 9/32* (2006.01)
*H04L 29/06* (2006.01)
*H04L 9/00* (2006.01)
*G06F 21/00* (2006.01)

(52) U.S. Cl. ............... 713/155; 380/270; 380/46; 726/7
(58) Field of Classification Search .................. 713/155; 380/270, 46; 726/7
See application file for complete search history.

(56) References Cited

U.S. PATENT DOCUMENTS
2004/0264492 A1* 12/2004 Blahut et al. ................. 370/442
2005/0286547 A1* 12/2005 Baum et al. ................... 370/437
2008/0012745 A1* 1/2008 Baek et al. .................... 341/173
2008/0159427 A1* 7/2008 Kang et al. .................... 375/260
2009/0315779 A1* 12/2009 Chin et al. ..................... 342/463

OTHER PUBLICATIONS

Sushant Jain et al., Using redundancy to cope with failures in a delay tolerant network. SIGCOMM '05 Proceedings of the 2005 conference on Applications, technologies, architectures, and protocols for computer communications ACM SIGCOMM Computer Communication Review. vol. 35 Issue 4, Oct. 2005. ACM New York, NY, USA. pp. 1-12.*
U.S. Appl. No. 12/562,190, titled "*System and Method for Accelerated Network Entrance*", inventors Wei-Peng Chen et al., 56 pages including drawings, filed Sep. 18, 2009.

* cited by examiner

*Primary Examiner* — Kambiz Zand
*Assistant Examiner* — Aubrey Wyszynski
(74) *Attorney, Agent, or Firm* — Baker Botts L.L.P.

(57) ABSTRACT

In one embodiment, a method for wireless communication includes providing, at a base station, access to a network to a preferred endpoint. The method includes sending, at the base station, at least one cryptographic parameter to the preferred endpoint. In addition, the method includes receiving, at the base station, a plurality of ranging codes from the preferred endpoint. The plurality of ranging codes are received after the base station has ceased providing the preferred endpoint access to the network. Also, the method includes determining, at the base station, that the plurality of received ranging codes correspond to a plurality of ranging codes of a predetermined set of ranging codes. The predetermined set of ranging codes is determined utilizing the at least one cryptographic parameter. Further, the method includes providing, at the base station, an entrance to the network to the preferred endpoint in response to determining that the plurality of received ranging codes correspond to the plurality of ranging codes of the predetermined set of ranging codes.

18 Claims, 8 Drawing Sheets

SYSTEM AND METHOD FOR ENHANCED NETWORK ENTRANCE INTO A WIRELESS NETWORK

RELATED APPLICATION

This application claims benefit under 35 U.S.C. §119(e) of U.S. Provisional Application Ser. No. 61/110,272, entitled "ACCELERATED RANGING AND NETWORK ENTRANCE IN WIRELESS NETWORKS,", filed Oct. 31, 2008.

This application also claims benefit under 35 U.S.C. §119 (e) of U.S. Provisional Application Ser. No. 61/222,795, entitled "SYSTEM AND METHOD FOR ENHANCED NETWORK ENTRANCE INTO A WIRELESS NETWORK,", filed Jul. 2, 2009.

TECHNICAL FIELD

This invention relates generally to wireless communication and more particularly to a system and method for enhanced network entrance into a wireless network.

BACKGROUND

In certain forms of wireless communication, endpoints must communicate with the base station in order to gain access to a wireless network. This initial communication between the endpoints and the base station is how the endpoints enter into the wireless network. Problems with network entrance procedures include latency and the speed at which an endpoint may enter into the wireless network. It is also difficult to allow for a preferred entity to gain faster access to the wireless network. In addition, network entrance procedures may be susceptible to attacks by malicious users.

SUMMARY

In one embodiment, a method for wireless communication includes providing, at a base station, access to a network to a preferred endpoint. The method includes sending, at the base station, at least one cryptographic parameter to the preferred endpoint. In addition, the method includes receiving, at the base station, a plurality of ranging codes from the preferred endpoint. The plurality of ranging codes are received after the base station has ceased providing the preferred endpoint access to the network. Also, the method includes determining, at the base station, that the plurality of received ranging codes correspond to a plurality of ranging codes of a predetermined set of ranging codes. The predetermined set of ranging codes is determined utilizing the at least one cryptographic parameter. Further, the method includes providing, at the base station, an entrance to the network to the preferred endpoint in response to determining that the plurality of received ranging codes correspond to the plurality of ranging codes of the predetermined set of ranging codes.

In some embodiments, determining that the plurality of received ranging codes corresponds to the plurality of ranging codes of the predetermined set of ranging codes may further comprise (a) determining that a time delay associated with a first received ranging code is approximately equal to a time delay associated with a second received ranging code. In addition, providing the entrance to the network may further comprise providing the entrance to the network in response to the determination in step (a). In various embodiments, determining that the plurality of received ranging codes corresponds to the plurality of ranging codes of the predetermined set of ranging codes may further include determining that the ranging slots of the plurality of received ranging codes correspond to the ranging slots of the plurality of ranging codes of the predetermined set of ranging codes. The at least one cryptographic parameter may include at least one cryptographically secure pseudorandom number generator credential.

According to one embodiment, a system for wireless communication includes a radio. The radio is operable to provide a preferred endpoint access to a network. The radio is also operable to send at least one cryptographic parameter to the preferred endpoint. Further, the radio is operable to receive a plurality of ranging codes from the preferred endpoint. The plurality of ranging codes are received after the base station has ceased providing access to the network to the preferred endpoint. The system also includes one or more processors operable to determine that the plurality of received ranging codes correspond to a plurality of ranging codes of a predetermined set of ranging codes. The predetermined set of ranging codes is determined utilizing the at least one cryptographic parameter. The one or more processors are also operable to provide an entrance to the network to the preferred endpoint in response to determining that the plurality of received ranging codes correspond to the plurality of ranging codes of the predetermined set of ranging codes.

Depending on the specific features implemented, particular embodiments may exhibit some, none, or all of the following technical advantages. Ranging may be accomplished in a manner that prefers certain users over others. For such preferred users, the time it takes for an endpoint to enter the network may be reduced. Furthermore, using cryptographic methods, the ranging process may be made less vulnerable to malicious users. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
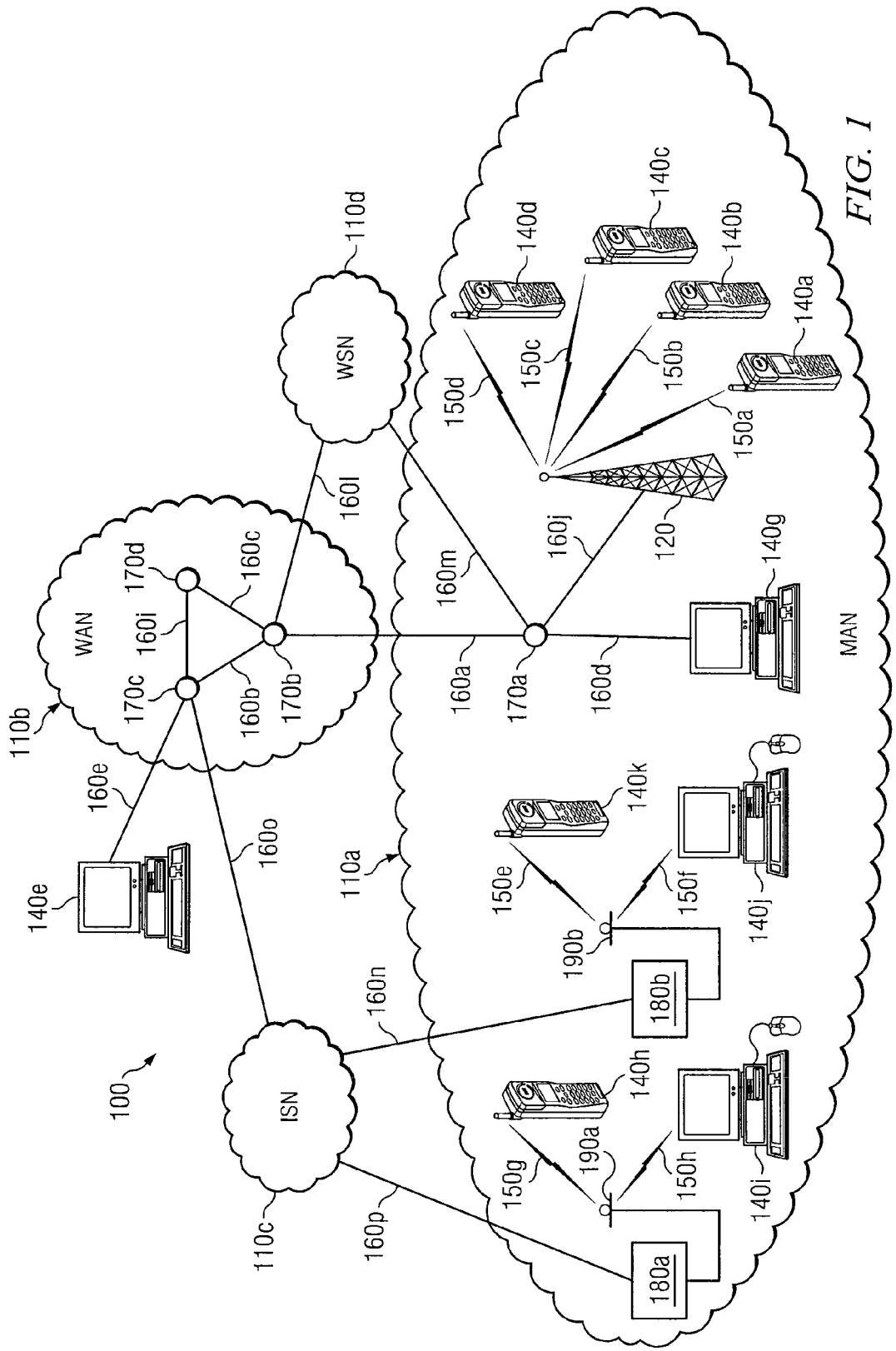
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks comprising any of a variety of communication protocols designed to support one or more different services either independently or in conjunction with other networks and/or communications protocols. For example, networks 110 may facilitate network and/or Internet access, via wired or wireless connections (e.g., a WiMAX service). The network access may allow for online gaming, file sharing, peer-to-peer file sharing (P2P), voice over Internet protocol (VoIP) calls, video over IP calls, or any other type of functionality typically provided by a network. In particular embodiments, one or more of networks 110 may comprise an IEEE 802.16 based wireless network, popularly known as WiMAX, which may include macro base stations (mBSs), such as mBS 120, and femto base stations (fBSs), such as fBSs 190. Each of these components may provide endpoints 140 with access to one or more of networks 110 utilizing wireless connections 150.

For simplicity and ease of discussion, the remainder of this description may use a simplified nomenclature for the various entities that may be involved. 'Owner' may refer to the entity that has purchased an fBS or to whom the fBS is registered. 'User' may refer to the entity to whom a wireless service is being provided. 'Internet service' may refer to the service that the owner uses to access external networks, such as the Internet. While the term 'Internet' is used, it is used for simplicity and is not intended to be limited to only the Internet but includes any type of network, including public and private networks, that the fBS may use to establish its backhaul connection (as further described below). 'Internet service provider' (ISP) may refer to the entity that provides the Internet service for the owner. 'Wireless service' or 'carrier service' may refer to the service that the user uses for wireless access, such as WiMAX. 'Wireless service provider' (WSP) may refer to the entity that provides the wireless service for the user or owner. While this nomenclature is used for simplicity, it does not represent the entire scope of all possible embodiments. For example, an owner may also be a user and the ISP may also be the WSP. As another example, the ISP may not be directly providing the owner with Internet access (e.g., the ISP may provide a building with Internet access, the building owner may then provide the fBS owner with Internet access).

In the embodiment depicted in FIG. 1, network 110a includes fBSs 190. fBSs 190 may, in essence, be small base stations purchased (or leased) by the owner from the WSP. The owner is then responsible for installing the fBS, for example, at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS). In the scenario depicted in FIG. 1, fBSs 190 are connected to network access devices 180. This connection may provide fBSs 190 with backhaul connections to the WSP's network, WSN network 110d. Network access device 180 may provide the owner with general Internet access. fBSs 190 do not use dedicated backhaul communication lines associated with the WSP, but rather use the owner's existing Internet access. Depending on the embodiment and scenario, the ISP and the WSP may be the same entity.

In some embodiments, endpoints 140 may be configured to initiate a communication session with fBSs 190 by utilizing ranging channels, ranging codes, and/or ranging slots. One or more ranging codes may be transmitted in one or more ranging slots on one or more ranging channels from an endpoint to a fBS. The fBS may receive the one or more ranging codes and determine that it will enter into a communication session with the endpoint that transmitted the ranging code(s). In various embodiments, ranging codes may comprise a variety of different types of encoding schemes. For example, a ranging code may include a series of binary numbers; the ranging code may also be a symbol such as a QAM (Quadrature Amplitude Modulation) symbol, a QPSK (Quadrature Phase-Shift Keying) symbol, or a BPSK (Binary Phase-Shift Keying) symbol. Ranging slots may represent a timing parameter or a frequency parameter associated with the ranging code. For example, ranging codes may be sent in specific timeslots when communicating with the fBS. As another example, the ranging codes may be communicated on a particular frequency or set of sub-frequencies. In a WiMAX protocol, the endpoint may send CDMA (Code Division Multiple Access) codes on an uplink frame dedicated for ranging purposes to the fBS.

In some embodiments, several steps may have to occur after the ranging process in order for an endpoint to enter the network. These steps may include items such as negotiating basic capabilities between the endpoint and the fBS, registering with the base station, establishing IP connectivity, establishing the time of day, transferring operational parameters, and establishing a provision connection. This network entrance procedure may be modified in order to provide faster entrance to the network. As discussed further below, such enhancements may be available for that endpoints have previously connected to the fBS.

The network entrance procedure may be enhanced. For example, in an environment such as the one depicted in FIG. 1, where fBSs 190 are used to grant access to the network to a variety of endpoints 140, a fBS may provide preferred service to particular endpoints. This might be in contrast to other endpoints that may not be preferred. For example, it was discussed above that fBS 190 may be providing network access to endpoints that do not belong to the owner of fBS 190. Hence when an owner of fBS 190 would like to enter the network, the owner may be preferred instead of another endpoint that does not belong to the owner that may be using fBS 190 for access to a network.

In order to accomplish this preference, in some embodiments, the owner or other preferred endpoints may send a set of ranging codes that fBS 190 may recognize as being sent from endpoints that should be treated in a preferential manner. Such ranging may be used in a network entrance or handover process. In some embodiments, a handover process may occur when an endpoint is transferred from an fBS to an mBS and/or from an mBS to an fBS. Further, in some embodiments, the set of ranging codes that belong to a preferred entity may be determined in a pseudorandom manner using cryptographically secure means. This may make it difficult for malicious users to merely copy a set of ranging codes and use them to gain preferred access. Further details of these and other embodiments are given below with respect to FIGS. 2-6.

In addition to enhancing the ranging process, the network entrance process after the ranging process may also be optimized when using an fBS. For example, features or parameters of an endpoint that regularly use the fBS may be stored at the fBS such that the stored parameters may be used to facilitate entrance to the network for the endpoint. In contrast, if this were not done before ranging, an endpoint may have to send messages to the fBS informing the fBS about parameters of the endpoint. Reducing the amount of messages sent between the fBS and the endpoint after ranging may, in some embodiments, decrease the time it takes for the endpoint to gain entrance to the network. Further details of these and other embodiments are given below with respect to FIGS. 2-6.

Although the example communication system 100 of FIG. 1 includes four different networks, networks 110a-110d, the term "network" should be interpreted as generally defining any network or combination of networks capable of transmitting signals, data, and/or messages, including signals, data or messages transmitted through web pages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired network.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b a WAN (e.g., a long range optical network or the Internet); network 110d is a wireless service network (WSN) which may be operated by the WSP responsible for providing network 110a with wireless service (e.g., WiMAX); and network 110c is an Internet service network (ISN) which may be operated by the ISP responsible for providing its users with Internet access. Though not depicted in FIG. 1, both WSN network 110d and ISN network 110c may include servers, modems, gateways and any other components that may be needed to provide their respective service.

While networks 110 have been depicted as four separate networks, depending on the scenario any two, or more, of the networks may be a single network. For example, the WSP and the ISP may be the same business entity which may maintain the necessary components for both services on the same network thus merging ISN network 110c and WSN network 110d into a single network. Furthermore, the interconnections between networks 110 may vary from those depicted in FIG. 1.

Generally, networks 110a-d provide for the communication of packets, cells, frames, or other portions of information (generally referred to as packets herein) between endpoints 140 and/or nodes 170 (described below). In particular embodiments, networks 110a-d may be IP networks. IP networks transmit data by placing the data in packets and sending each packet individually to the selected destination, along one or more communication paths. Any of networks 110a-110d may be coupled to other IP networks including, but not limited to, the Internet. Because IP networks share a common method of transmitting data, signals may be transmitted between devices located on different, but interconnected, IP networks. In addition to being coupled to other IP networks, any of networks 110a-d may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX mBS, along with one or more fBSs, in certain cases, may allow network 110a to cover the larger geographic area associated with a MAN while using a relatively small number of wired links. More specifically, by properly arranging mBS 120 and fBSs 190 around a metropolitan area, the multiple access stations may use wireless connections 150 or existing wired links to communicate with mBS 120, and wireless connection 150 to communicate with wireless endpoints 140 throughout the metropolitan area. mBS 120 may, through wired connection 160a, communicate with other mBSs, any components of network 110d, any network components not capable of establishing a wireless connection, and/or other networks outside of the MAN, such as the Internet.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's Internet access, provided by the owner's ISP via the ISP's network (e.g., network 110c), for its backhaul connection to the WSP's network (e.g., network 110d).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
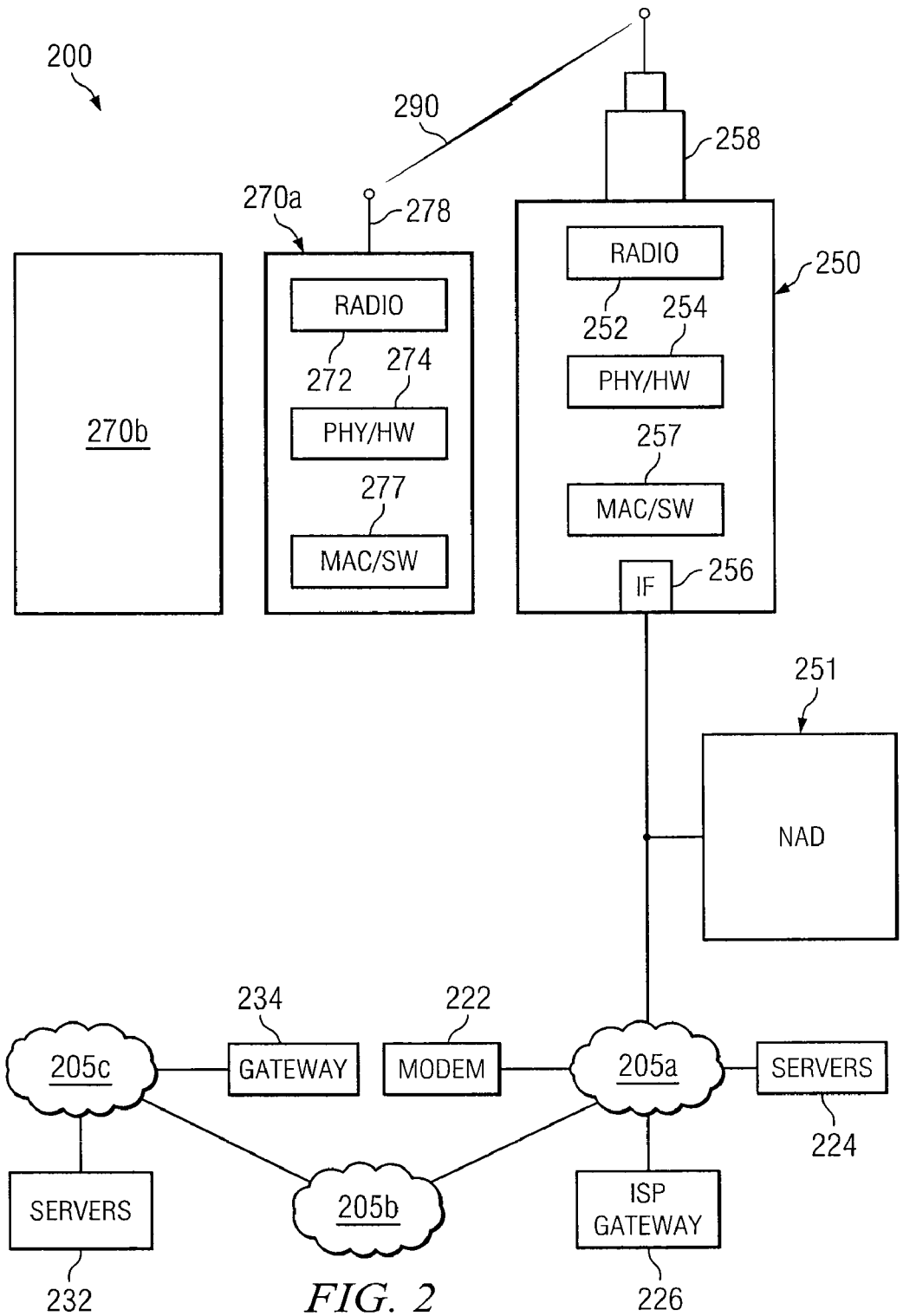
FIG. 2 illustrates one embodiment of a wireless network comprising endpoints, a femto base station, and a network access device.

FIG. 2 illustrates a wireless network comprising a more detailed view of a system 200 including endpoints 270, network access device 251, and fBS 250, in accordance with a particular embodiment. The depicted embodiment is a simplified scenario comprising networks 205, fBS 250, network access device 251, and endpoints 270. Endpoints 270 may utilize fBS 250 to gain access to network 205c. Endpoint 270a may receive preferred service from fBS 250, as will be further discussed below.

In various embodiments, system 200 may comprise any number of wired or wireless networks, mBSs, endpoints, fBSs, and/or any other components that may facilitate or participate in the communication of data and/or signals whether via wired or wireless connections. Endpoint 270a and fBS 250 comprise PHY/HW blocks 274 and 254, MAC/SW blocks 277 and 257. fBS 250 further comprises communication interface 256. Endpoint 270a and IBS 250 also include radios 272 and 252 and antennas 278 and 258. These components may work together in order to provide wireless networking functionality, such as providing endpoints with wireless connections in a wireless network (e.g., a WiMAX wireless network). In some embodiments, PHY/HW blocks 254 and 274 comprise components and hardware operable to interact with a physical layer of a communication protocol. MAC/SW blocks 257 and 277 may comprise components and software operable to interact with a medium access control layer of a communication protocol. More details regarding aspects and components of FIG. 2 are provided below.

Networks 205 may comprise separate but interconnected networks operated by one or more different operators. More specifically, network 205a may be the ISP's network, network 205b may be a public network (e.g., the Internet), and network 205c may be the WSP's network. The owner of fBS 250 may use network 205a for Internet access. In providing the owner with network access, the ISP's network 205a may include modems 222, servers 224, and ISP gateway 226. Modems 222 may be used by the ISP to communicate with the owner's network access device 251. Thus, network access device 251 and modems 222 may have complimentary hardware and/or software that may enable them to communicate data between one another. Network access device 251 may act as the owner's access point, similar to network access device 180 discussed above with respect to FIG. 1. Modems 222 may act as a gateway between the ISP's network 205a and the owner's network access device 251. In particular embodiments, modems 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b.

Network 205c may be a WiMAX service provider's network. Depending on the scenario, network 205c may be the user's or the owner's WiMAX service provider's network. In providing the WiMAX service, network 205c may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205c with network 205b.

Networks 205a and 205c may be coupled via network 205b. In some embodiments, network 205b may be the Internet. Thus, in such embodiments, fBS 250 may connect to the WSP's network, network 205c, via the Internet. Though network 205b is depicted as a single network, it may comprise any number of the networks described above with respect to FIG. 1. For example, network 205b may comprise the Internet, a LAN, WAN, MAN, PSTN or some combination of the above.

PHY/HW blocks 254 and 274 may include any hardware needed for the operation of fBS 250 and endpoint 270a, respectively. For example, PHY/HW blocks 254 and 274 may each comprise one or more processors as well as analog-to-digital and digital-to-analog converters. Each processor may be a microprocessor, controller, application specific integrated circuit (ASIC), field programmable gate array (FPGA), or any other suitable computing device, resource, or combination of hardware, software and/or encoded logic operable to provide, either alone or in conjunction with other components (e.g., memory), wireless networking functionality. Such functionality may include providing various wireless features discussed herein. For example, using such components endpoint 270a may be able to generate a set of ranging codes for transmission while fBS 250 may be able to analyze received ranging codes and compare them to a predetermined set of ranging codes.

In some embodiments, PHY/HW block 254 may include one or more correlators. Correlators may be a discrete component or their functionality may be provided by using a combination of the hardware described above. The correlators may operate by comparing received signals to predetermined symbols and outputting a value based on the degree of similarity between the received signals and the predetermined symbols. More details regarding these and other embodiments are given below with respect to FIGS. 2A-6.

PHY/HW blocks 254 and 274 may also each comprise memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules may store any suitable data, instructions, logic or information utilized by fBS 250 and endpoint 270, respectively, including software embedded in a computer readable medium, and/or encoded logic incorporated in hardware or otherwise stored (e.g., firmware). In various embodiments, the memory modules may store information and/or instructions regarding protocols and parameters for how fBS 250 may facilitate network entrance for endpoints 270. For example, predetermined ranging codes may be stored as well as logic for designating one or more of endpoints 270 as preferred. In some embodiments, PHY/HW block 254 of fBS 250 may be configured similarly as a macro base station, such as mBS 120.

MAC/SW blocks 257 and 277 may include any software, logic, or other information needed for the operation of fBS 250, and endpoint 270a, respectively. In particular embodiments, the software, logic or other information may be stored within the memory modules of PHY/HW blocks 254 and 274. This may be put to many uses. For example, blocks 257 and 277 may store various parameters, such as those used to generate cryptographically secure random numbers or parameters for use in a network entrance procedure. Procedures for designating one or more of endpoints 270 as preferred may also be stored. As another example, sets of ranging codes corresponding to one or more endpoints 270 may be stored as well.

Radios 252 and 272 may be coupled to or be a part of antennas 258 and 278, respectively. Radios 252 and 272 may receive digital data that is to be sent out to other mBSs, fBSs, and/or endpoints via a wireless connection. More information regarding example operations of the radios may be understood by examining the FIGS. 2A-6 and their respective descriptions.

Antennas 258 and 278 may be any type of antenna capable of transmitting and receiving data and/or signals wirelessly. In some embodiments, antennas 258 and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 252 and antenna 258, and radio 272 and antenna 278 may each form a wireless interface.

Communication interface 256 may be used for the wired communication of signaling and/or data between fBS 250 and networks 205. For example, communication interface 256 may comprise an interface (e.g., RJ-45) that is compatible with a corresponding interface on network access device 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via network access device 251, to provide the backhaul connection to network 205c, as opposed to the WiMAX service provider supplying the backhaul connection.

Network access device 251 may be used to provide the owner with Internet access. fBS 250 may utilize the Internet access for its backhaul connection to WiMAX network 205c. Depending on the type of network service and/or the user's service provider, network access device 251 may be a cable modem, a digital subscriber line (DSL) modem, a fiber optic modem, or any other modem, gateway or network access device provided by the owner's network service provider. The owner may have any number of routers, switches and/or hubs between fBS 250 and network access device 251.

As part of establishing a backhaul connection, fBS 250 may communicate with network access device 251. Network access device 251, which may be provided or authorized by the user's ISP, may provide fBS 250 with access to the ISP's network 205a which may then allow access to network 205c, via network 205b. Accessing network 205a may involve modem 241 communicating with the ISP's modems 222.

The ISP may operate one or more servers 224 (e.g., OAM&P, AAA, DHCP servers) in providing the user with Internet access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and servers 232. Similar to the servers and gateways of ISP network 205a, gateway 234 and servers 232 may ensure that the user has a valid WiMAX account and that network 205c is able to communicate with other networks, such as network 205b. Servers 232 may also contain information, data, instructions and/or logic that may be used to provision various features and functionality of fBS 250. For example, they may provide fBS 250 with channel information for its wireless connection 290 with endpoint 270.

Endpoints 270 may be any type of wireless endpoint able to send and receive data and/or signals to and from fBS 250. Some possible types of endpoints 270 may include desktop computers, PDAs, cell phones, smart phones, laptops, and/or VoIP phones.

Figure 2A:
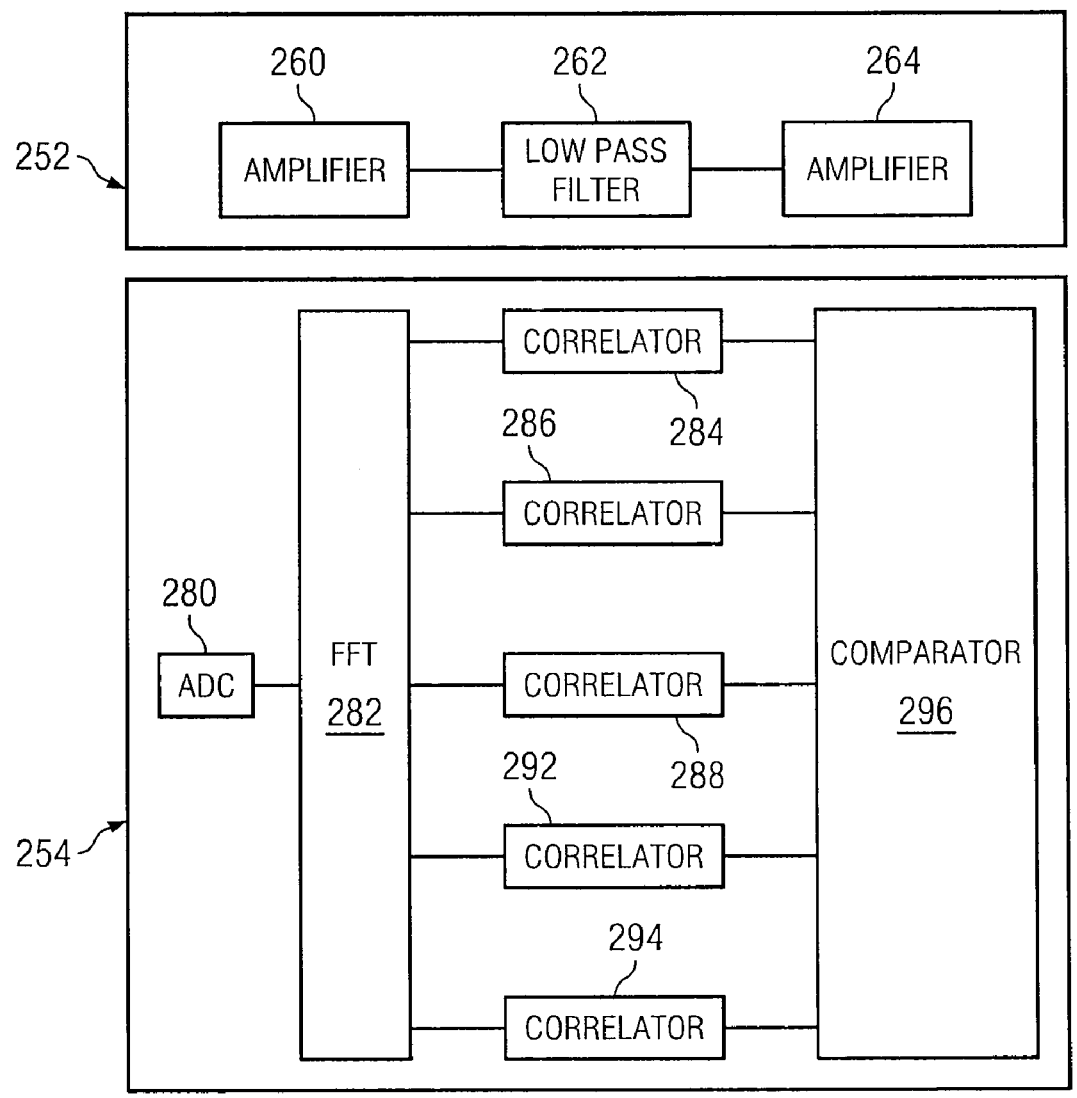
FIG. 2A illustrates one embodiment of certain components of the femto base station of FIG. 2.

FIG. 2A illustrates a more detailed view of one embodiment of radio 252 and PHY/HW 254. Radio 252 includes amplifier 260 that is coupled to low pass filter 262. The output of low pass filter 262 is coupled to amplifier 264. With such a configuration, radio 252 may amplify a received signal using amplifier 260, filter the received signal using low pass filter 262, and amplify the filtered signal using amplifier 264. The received signal may be represented as:

$$r(t) = \sum_{m=0}^{M-1} \sum_{i=0}^{SF-1} \sum_{k=0}^{N-1} C_m[i] \cdot A_{m,i}^k \cdot \alpha_{m,i}^k \cdot \exp\left\{j2\pi\left(f_c + \frac{i}{T_b}\right)(t - t_{TTD}^m - \tau_{m,i}^k)\right\} + n(t)$$

where: $C_m[i]$ is the ranging code at the ith subcarrier from the mth user of the M users transmitting ranging codes at ranging slot t; n(t) is the noise signal at slot t; SF is the number of subcarriers used in one ranging subchannel; N is the number of multipath propagation channels; $T_b$ is the OFDMA symbol duration; and $t_{TTD}$ represents transmission time delays. The channel model for ith subcarrier can be represented as:

$$h_{m,i}(t) = \sum_{k=0}^{N-1} A_{m,i}^k \cdot \alpha_{m,i}^k \cdot \exp\{j\phi_{m,i}^k\} \cdot \delta(t - \tau_{m,i}^k)$$

where: A is an attenuation factor; α is a random magnitude; exp{j} is a random phase; and τ is a multipath delay for the ith path.

PHY/HW 254 includes analog-to-digital converter 280, Fast Fourier Transform (FFT) 282, correlators 284-294, and comparator 296. PHY/HW 254 may receive the amplified signal from amplifier 264 and convert the signal to a digital format using ADC 280. The digital signal outputted from ADC 280 may be converted into a frequency domain using FFT 282. The output of FFT 282 may be sent to correlators 284-294. Correlators 284-294 may analyze the output of FFT 282 to determine if various codes or symbols (such as ranging codes) are present in the signal. Correlators 284-294 may output a signal indicating if codes or symbols have been detected. This may be done according to the following:

$$R = \max_{\Delta t} \sum_{i=0}^{SF-1} \int_{n \cdot T_b} r(t) \frac{C_m[i]}{T_b} \cdot \exp\left[\left\{j 2\pi\left(f_c + \frac{i}{T_b}\right)(-\Delta t)\right\}*\right] dt$$

where all possible transmission time delay and clock offset values are represented by Δt. R provides a value that accounts for correlation across multiple slots. The strength of the signal outputted by correlators 284-294 may be increased or decreased depending on the statistical likelihood of correctly identifying codes or symbols present in the signal. Comparator 296 may determine if the detected symbols or codes as determined by correlators 284-294 are symbols or codes that match a predetermined set of symbols or codes.

Thus far several different embodiments and features have been presented. Particular embodiments may combine one or more of these features depending on operational needs and/or component limitations. This may allow for great adaptability of network 200 to the needs of various organizations and users. The following examples may help to illustrate how these components inter-work with one another to provide the functionality of particular embodiments.

Referring again to FIG. 2, endpoint 270a, in some embodiments, may attempt to gain entrance to a network by entering a ranging session with fBS 250. Previous to this attempt, endpoint 270a and fBS 250 may have been in a communication session where one or more parameters may have been stored, for example, in MAC/SW blocks 257 and 277. Such parameters may include operational capabilities of endpoint 270a, authentication information regarding endpoint 270a, and shared cryptographic parameters between endpoint 270a and fBS 250. Using the stored cryptographic parameter, endpoint 270a may use PHY/HW block 274 and/or MAC/SW block 277 to generate a random number that will be used to select a set of ranging codes. Using radio 272 and antenna 278, endpoint 270a may transmit the generated set of ranging codes to fBS 250. fBS 250 may use radio 252 and/or antenna 258 to receive the transmitted set of ranging codes as well as other ranging codes transmitted by other endpoints (such as endpoint 270b). Before, during, or after receiving the ranging codes, fBS 250 may generate a set of ranging codes using the cryptographic parameter. fBS 150 may use PHY/HW block 254 and/or MAC/SW block 257 to generate the set of ranging codes. Using correlators 284, 286, 288, 292 and 294 as well as comparator 296, fBS 250 may be able to determine if the received ranging codes correspond to the set of ranging codes generated by fBS 250. If a portion of the received ranging codes correspond, then fBS 250 may initiate network entrance procedures with endpoint 270a, having recognized endpoint 270a as a preferred endpoint. The network entrance procedure initiated by endpoint 270a may, in some embodiments, be shortened by utilizing the stored parameters. Thus, fBS 250 may utilize MAC/SW block 257 to retrieve the stored parameters regarding endpoint 270a and proceed to facilitate network entrance endpoint 270a. In particular embodiments, endpoint 270a may be recognized as preferred without having to send in a particular set of ranging codes. In such and other embodiments, endpoint 270a may send an authentication code after a normal ranging session with fBS 250. fBS 250 may identify endpoint 270a as preferred using the authentication code. One example of such an authentication code is a cipher-based message authentication code (CMAC) Type-Length-Value (TLV). Hence, preferred endpoint 270a may be recognized as preferred by fBS 250 in a variety of ways, not all of which require using a special ranging code procedure.

In some embodiments, endpoint 270b, which may be similarly configured in terms of components as endpoint 270a, may also attempt to enter the network by entering a ranging session with fBS 250. In contrast to endpoint 270a, endpoint 270b may randomly select one or more ranging codes to send to fBS 250. Hence, in some embodiments, the ranging codes received by fBS 250 may include both the ranging codes chosen by endpoint 270a in accordance with the shared cryptographic parameter as well as the randomly chosen one or more ranging codes sent by endpoint 270b. Before, during, or after processing the ranging codes sent by endpoint 270a, fBS 250 may determine that the communication received from endpoint 270b was a recognizable ranging code. If so, fBS 250 may enter into a network entrance procedure with endpoint 270b. However, this network entrance procedure may differ from that with endpoint 270a in that fBS 250 may not have parameters regarding endpoint 270b stored within memory elements that may be present in PHY/HW 254 and/or MAC/SW block 257. As a result, fBS 250 may need to send and receive messages wherein endpoint 270b communicates information and parameters that fBS 250 may use to facilitate endpoint 270b's entrance to a network.

In the preceding examples, endpoint 270a may be considered a preferred endpoint whereas endpoint 270b may be considered a non-preferred endpoint. Endpoint 270a may, for example, be associated with the owner of fBS 250 while endpoint 270b may be associated with an entity that may be associated with a mere user of the network provided by fBS 250. In some embodiments, fBS 250 may be a public fBS. In such cases, endpoint 270a may be associated with a user or set of users that has paid to be treated in a preferential manner while the entity associated with endpoint 270b may not have done so. Hence, there may be a variety of situations in which endpoints 270a and 270b, and in various embodiments, fBS 250 may detect which endpoint to treat with preference utilizing received ranging codes.

Thus far several different embodiments and features have been presented. Particular embodiments may combine one or more of these features depending on operational needs and/or component limitations. This may allow for great adaptability of network 200 to the needs of various organizations and users.

Figure 3A:
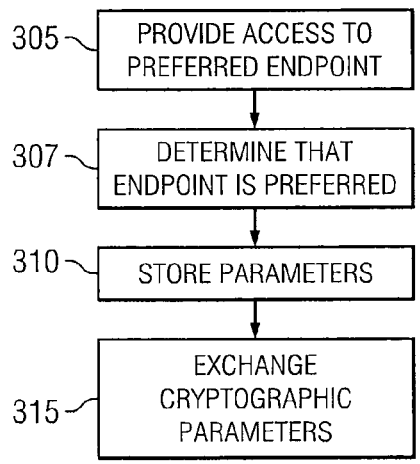
FIG. 3A is a flowchart illustrating one embodiment of a parameter exchange between an fBS and an endpoint during a communication session.
Figure 3B:
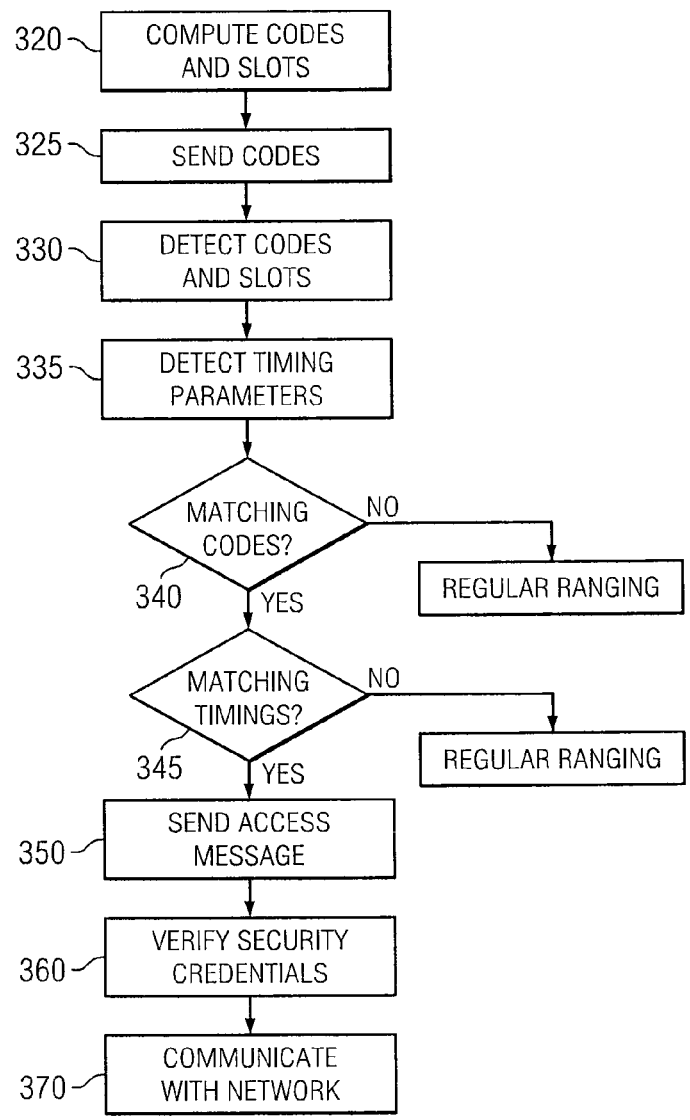
FIG. 3B is a flowchart illustrating one embodiment of a ranging process between a femto base station and a preferred endpoint.

FIG. 3A is a flowchart illustrating one embodiment of a parameter exchange between an fBS and an endpoint during a communication session. FIG. 3B is a flowchart illustrating one embodiment of a ranging process between a femto base station and a preferred endpoint. In general, the steps illustrated in FIGS. 3A-3B may be combined, modified, or deleted where appropriate, and additional steps may also be added to the example operation. Furthermore, the described steps may be performed in any suitable order.

At step 305, in some embodiments, an fBS may provide an endpoint access to a network. During this communication session, the endpoint may be recognized as a preferred endpoint, such as step 307. This may occur in response to: a message sent by the endpoint to the fBS requesting a preferred status; a setting established in the fBS during or after installation; and/or a message received at the fBS from the network requesting that the fBS treat the endpoint as preferred. Parameters used in establishing the communication session of step 305 may be stored at the fBS and at the endpoint at step 310 in response to the endpoint being recognized as preferred. The parameters may include communication parameters used to authenticate and/or facilitate the communication session. The parameters may indicate the capabilities of the endpoint and/or the fBS. The stored parameters may also include identification parameters. This may occur in response to acceptance by the endpoint of being treated as a preferred endpoint by the fBS. In some embodiments, when the fBS and the endpoint would like to enter into another communication session after the current communication session, they may utilize the stored parameters to enter the communication session faster, as further discussed below.

At step 315, in some embodiments, the fBS and the endpoint may exchange one or more cryptographic parameters. This may be in response to determining that the endpoint should be treated as a preferred endpoint by the fBS. The cryptographic parameters may be used to generate a cryptographically secure pseudorandom number. The cryptographic parameter may, in some embodiments, be generated by the fBS. This parameter may include an entropy input and may be generated uniquely for each endpoint. Examples of parameters that may be used to generate the cryptographic parameter include credentials, frame number, MAC address, or other such items based on the endpoint and the communication session. The cryptographic parameter may be transmitted in an encrypted manner between the fBS and the endpoint. One suitable encryption method is AES-CCM (Advanced Encryption Standard CTR Mode with CBC-MAC) via traffic encryption key (TEK). Any other suitable encryption methods may be employed. In some embodiments, the one or more cryptographic parameters may be different in every communication frame and unique per endpoint.

After the communication session occurring at step 305 has ended, the endpoint may seek to establish a new communication session with the fBS wherein the endpoint would like to be identified as preferred. To accomplish this, in some embodiments, a set of ranging codes and ranging slots may be selected by the endpoint using the cryptographic parameter(s), such as step 320. For example, the endpoint may utilize the exchanged cryptographic parameter(s) to generate a random number. The AES-128 algorithm in the category of DRBG Mechanisms based on Block Ciphers may be used to generate the random number. The random number may be generated using a cryptographically secure pseudorandom number generator. The ranging codes and ranging slots may be determined using the random number by selecting one or more bits of the random number as an index to choose from a set of ranging codes and ranging slots. For example, the starting ranging slot may be chosen by using the first most significant byte of the random number as an index to a set of ranging slots. Each ranging code may be chosen by using a portion of the random number as an index to a set of ranging codes. For example, the ith ranging code may be chosen by using the (i+1)-th most significant byte of the random number as an index to the set of available ranging codes. The confirmation code may also be generated using the random number as well, for example, the least significant byte of the random number may be used as an index to select the confirmation code.

At step 325, the endpoint may send the ranging codes in the ranging slots determined at step 320 to the fBS. The endpoint may send a set of ranging codes as opposed to one ranging code to the fBS in order to be identified as a preferred endpoint. In this manner, the endpoint may receive preferential treatment by the fBS in terms of accessing the network, as further described below.

At step 330, in some embodiments, the fBS may analyze received signals that may represent ranging codes in ranging slots. Detection may occur in this step wherein the fBS determines which, if any, ranging codes have been received. This detection may occur using correlators where a correlation value is determined as an output of the correlator and a match is determined if the correlation value exceeds a threshold. Before, during, or after the detection process, transmission time delays (TTD) may also be determined for each ranging slot (such as at step 335). Embodiments discussed with respect to FIGS. 2 and 2A may be used to accomplish steps 330 and 335.

At step 340, in some embodiments, the detected ranging codes are analyzed to determine if they contain a set of ranging codes sent from a preferred endpoint. The fBS may select a set of ranging codes and ranging slots in the same manner as the preferred endpoint did at step 320 to compare the received ranging codes against. While many procedures may be used to compare the received ranging codes to the set generated by the fBS, the following description is one example of how this may be accomplished. In some embodiments, the received ranging codes, together with their TTD values in each ranging slot, are recorded in two matrices, a Recognized Code Indicator (RCI) matrix and a Transmission Time Delay (TTD) matrix. In some embodiments, RCI[i,j] is equal to 1 when code i appears at slot j and is equal to 0 otherwise. An i-th row and j-th column element in RCI matrix, RCI[i,j], represents the indication whether code i appears at slot j. An i-th row and j-th column element in TTD matrix, TTD[i,j], represents the transmission time delay of the code i shown at slot j. The fBS determines if the detected ranging codes matches a vector of ranging codes that should have been sent from a preferred endpoint. Suppose in a frame, a series of ranging codes from a preferred endpoint user u is $(FC[ST_u], _{FC[ST_u}+1], \ldots, FC[ST_u+K-1])$ starting from the ranging slot $ST_u$ till the ranging slot $ST_u+K-1$. We simplify the representation of RCI and TTD for user u as:

$RCI_u = \{rc_ui[0], rci_u[1], \ldots, rci_u[K-1]\}$ where $rci_u[i] = RCI[FC_u[ST_u+i], ST_u+i]$ $TTD_u = \{ttd_u[0], ttd_u[1], \ldots, ttd_u[K-1]\}$ where $ttd_u[i] = TTD[FC_u[ST_u+i], ST_u+i]$ Therefore we can present the process of detecting the set of ranging codes from the user u starting from the ranging slot $ST_u$ till the ranging slot $ST_{u+K-1}$ if and only if:

$$\sum_{i=0}^{K-1} rci_u[i] \geq TH_1$$

where $TH_1$ is a constant and is a function of K, the length of a vector of a set of predetermined ranging codes. In general, the selection of $TH_1$ may consider the trade-offs between the probability of successfully detecting a set of ranging codes sent from a preferred endpoint and the probability of falsely detecting several single ranging codes from different endpoints. The higher the value of $TH_1$ is (i.e. closer to K), the lower the probability of successful detection of a set of ranging codes sent from a preferred endpoint, but meanwhile, the probability of false detection of a set of ranging codes sent from a preferred endpoint is lower as well. Hence, in some embodiments, an fBS may only detect a subset of the set of ranging codes sent by the preferred endpoint yet still recognize that the preferred endpoint submitted a set of ranging codes. If the fBS determines that a portion of the received, detected ranging codes corresponds to a set of endpoints that would have been sent by a preferred endpoint, the fBS may proceed step 345. If the fBS determines that the received ranging codes do not correspond to a set of ranging codes that may have been sent by a preferred endpoint, the fBS may treat the received ranging codes as individual ranging codes having been sent by different endpoints.

At step 345, in some embodiments, the fBS may check if the identified set of ranging codes in all the ranging slots have approximately the same TTD since all of these codes should have been sent from the same preferred endpoint. Suppose that the maximum tolerated difference in TTD is $\epsilon$. Then whether the set of ranging codes are from the same preferred endpoint can be tested as follows:

$$\left\{ \min_{\Delta t} \sum_{i=0}^{K-1} (ttd_u[i] - \Delta t)^2 \cdot rci[i] \right\} / \sum_{i=0}^{K-1} rci[i] \leq \varepsilon^2$$

where: $\Delta t$ is the estimated average transmission time delay of the ranging slots. In other words, if the average TTD difference of those successfully received ranging codes is less than $\epsilon$, one can consider these codes are from the same endpoint. Other suitable methods may be employed. If the fBS determines that the detected set of ranging codes were from the same endpoint, the MS may proceed to step 350. If not, the fBS may process the received ranging codes as if all of the ranging codes were sent by endpoints without preferred status (i.e., a normal ranging procedure).

In some embodiments, the fBS may use the TTD differences to analyze ranging codes sent by endpoints that are not preferred. For example, a malicious endpoint may send in multiple ranging codes in order to enhance the probability of being chosen to enter the network though doing so is contrary to established protocols. By comparing the TTD values for the received ranging codes, the fBS may be able to detect such malicious behavior and not allocate opportunities for such an entity to enter the network. In various embodiments, if a set of ranging codes contain a similar TTD value, but do not match a set of ranging codes generated by a preferred endpoint, the fBS may infer that the set of ranging codes was transmitted by a misbehaving endpoint and ignore those ranging codes.

At step 350, in some embodiments, the fBS may send a message to the preferred endpoint indicating that access has been granted. The fBS may recognize the identity of the endpoint by the set of ranging codes that it received. Based on this recognition, the fBS may retrieve parameters such as parameters stored at step 310 to facilitate providing entrance to the network for the endpoint. The message to the endpoint may include information the endpoint may use, such as allocation information, to enter the network. A suitable message may include a CDMA allocation IE message provided by the IEEE 802.16(e) specification. Security credentials may be verified by the fBS and the endpoint as well. For example, in step 360, the endpoint may send an authentication code to the fBS. In some embodiments, this may be a cipher-based message authentication code (CMAC). The message used to transmit this authentication code may be a RNG-REQ message as provided in IEEE 802.16(e) protocol. The fBS may verify the authentication code and provide a message to the endpoint after it has been verified. For example, the fBS may use a RNG-RSP message (as provided in IEEE 802.16(e) protocol) including an authentication code generated by the fBS based on a shared CMAC key with the preferred endpoint.

The fBS may also process the received ranging codes that do not belong to the set of codes sent by the preferred endpoint. The fBS may first allocate an entrance to the network for the preferred endpoint, then randomly choose to respond to any of the other received ranging codes with allocations if there are any available resources left. In some embodiments, the fBS may determine to not provide any allocations for other endpoints participating in the ranging session once it has determined that a preferred endpoint is attempting to enter the network.

At step 370, in some embodiments, the endpoint may have completed the entrance process for the communication session, enabling the endpoint to communicate with the network. Thus, in some embodiments, by sending a set of ranging codes the endpoint may be given preferred access to the network.

Figure 4:
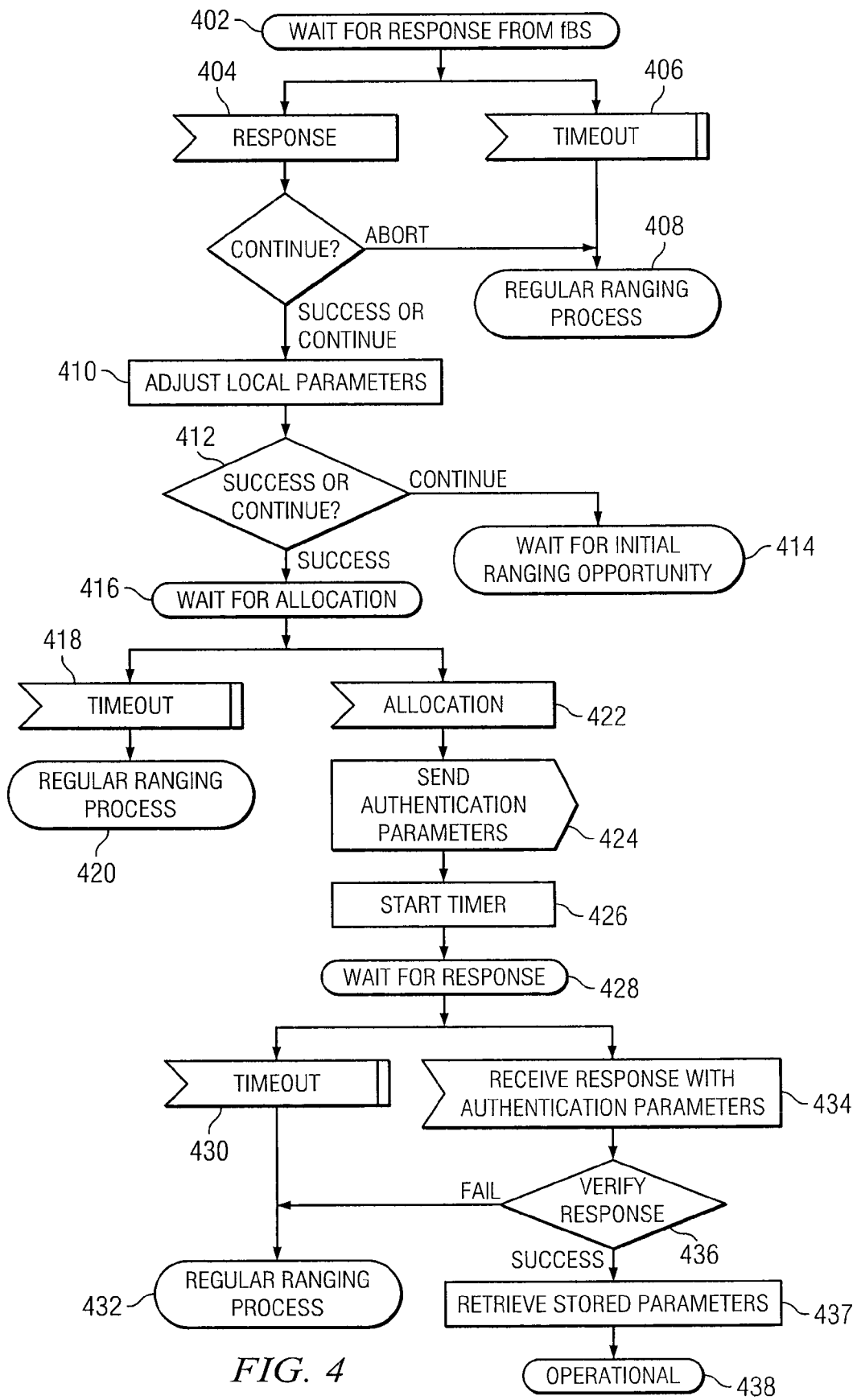
FIG. 4 is a state diagram illustrating one embodiment of the operation of an endpoint while participating in an enhanced network entrance procedure.
Figure 5:
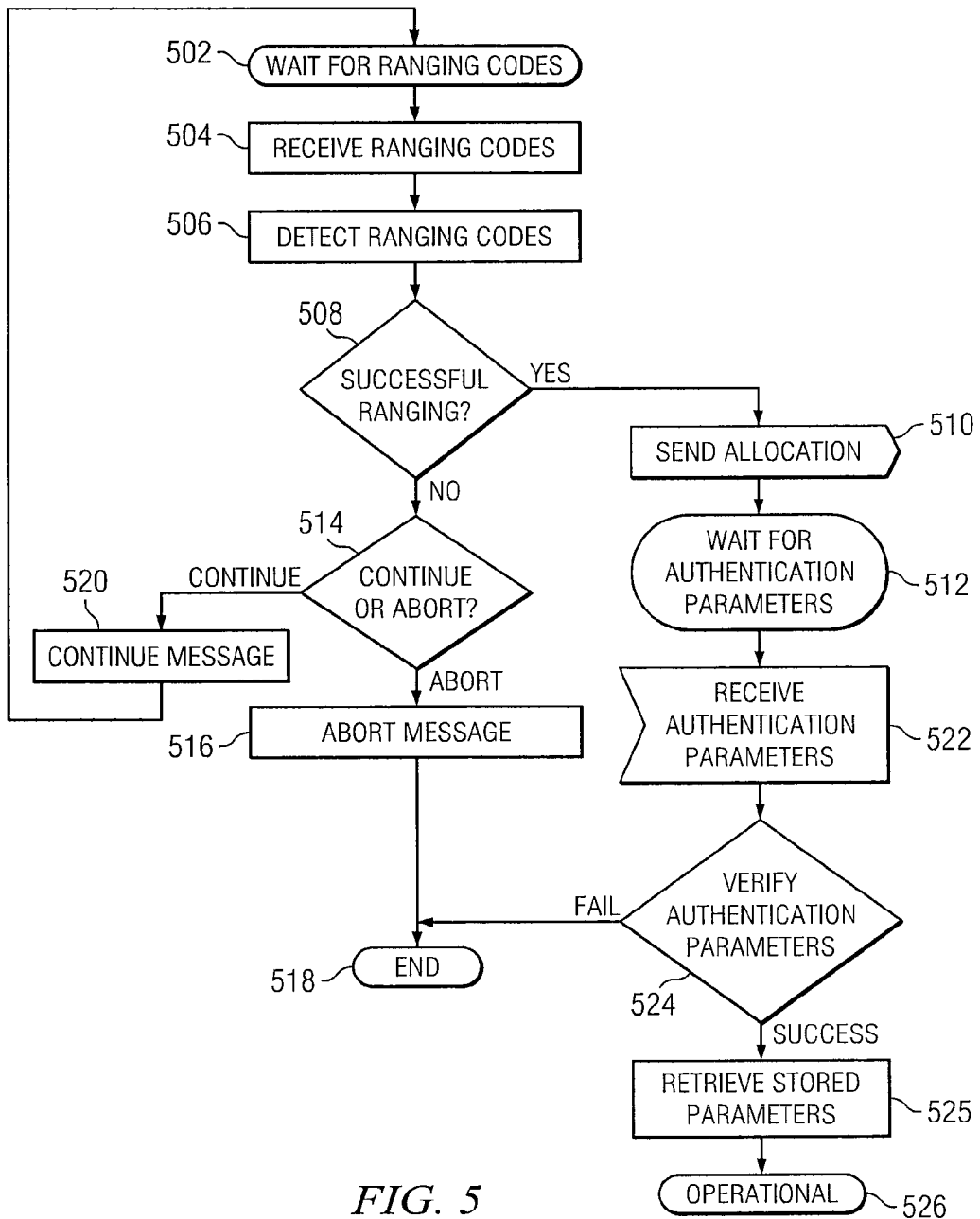
FIG. 5 is a state diagram illustrating one embodiment of the operation of a femto base station while participating in an enhanced network entrance procedure.

FIGS. 4 and 5 depict state diagrams of one embodiment of a preferred endpoint and a fBS, respectively. The depicted state diagrams illustrate the various states that the preferred endpoint and the fBS may enter after the preferred endpoint has transmitted a set of ranging codes to the fBS in order to be identified as preferred. After sending the set of ranging codes, the preferred endpoint may remain in state 402 as it awaits a response from the fBS. The fBS, though, remains in state 502: waiting to receive ranging codes. The preferred endpoint may set a timer as it enters state 402. If the timer expires before the preferred endpoint receives communication from the fBS, the preferred endpoint may enter into state 406: a timeout state. The preferred endpoint may then proceed to state 408 by entering into a normal ranging session in which the endpoint may only send one ranging code. In some embodiments, the preferred endpoint may retry to enter the network as a preferred endpoint and may send another set of ranging codes to that end. In such embodiments, the preferred endpoint may proceed to state 402 after the timeout instead of state 408.

Once the fBS receives the ranging codes, it may transition to state 504. At state 506, the fBS may attempt to detect the received ranging codes and determine if a set of ranging codes from a preferred endpoint were sent. This may be done, in some embodiments, as described in FIGS. 2 and 3. At state 508, the fBS may determine if the ranging session was successful. This may be based on probabilities associated with the detection of the ranging codes and/or detection of a set of ranging codes transmitted in order for an endpoint to be treated as preferred, as described above. If the ranging is not successful, the fBS may enter state 514 and either send a message to the preferred endpoint to continue, as in state 520, (e.g., responding with a RNG-RSP message) or to abort the ranging session, as in state 516. Each of these messages, in some embodiments, may be sent using a RNG-RSP command provided in the IEEE 802.16(e) protocol. If the fBS sends a message to the preferred endpoint to continue (state 520), the fBS may then return to state 502 as it waits to receive a set of ranging codes. However, if the fBS sends an abort message (as in state 516), the fBS may transition to state 518 and end the ranging session.

If the fBS sends an abort message as in state 516, the preferred endpoint may transition to state 408. If the fBS sends a success or continue message, the preferred endpoint may transition to state 410 where the preferred endpoint may adjust one or more local parameters based on the message received from the fBS. In some embodiments, this may not need to be done and the fBS may proceed directly to state 412. At state 412, the preferred endpoint may determine if the message received from the fBS was a continue message or a success message. If it was a continue message, the preferred endpoint may wait for another ranging opportunity so that the endpoint may resend the ranging codes as in state 414. In some embodiments, the endpoint may send another set of ranging codes. If it was a success message, the preferred endpoint may await an allocation from the fBS as in state 416. Before or after the fBS transitions to state 416, the preferred endpoint may start a timer. If the timer expires before receiving an allocation from the fBS, the endpoint may enter state 418 and proceed to state 420 by attempting to use a regular ranging procedure. In some embodiments, the endpoint may retry sending a set of ranging codes to be treated as a preferred endpoint after entering the timeout state 418.

The fBS may enter state 510 if it successfully detected a set of ranging codes as identifying a preferred endpoint. In state 510, the fBS may send a message containing an allocation for the preferred endpoint to enter the network. In some embodiments, this message may be a femto CDMA allocation IE as provided by the IEEE 802.16(e) protocol. The fBS may then transition to state 512 as it waits for authentication parameters from the preferred endpoint. Such parameters may include parameters used for securing and/or authenticating the communication session between the fBS and the endpoint. For example, the fBS may await a cipher based message authentication code (CMAC) parameter.

The endpoint may receive the allocation at state 422. It may then transition to state 424 where it sends one or more authentication codes (such as a CMAC parameter) to the fBS. In some embodiments, the endpoint may use a RNG-REQ message (as provided by the IEEE 802.16(e) protocol) that includes the CMAC parameter to the fBS. It may then start a timer as in state 426 and await a response from the fBS as in state 428. If the timer expires before the fBS responds, the endpoint may enter timeout state 430 and proceed to state 432 where it may attempt to enter a regular ranging session with the fBS where it does not attempt to be treated as a preferred endpoint. In some embodiments, it may retry sending a set of ranging codes to be treated as preferred instead of entering the regular ranging session.

At state 522, the fBS may receive the authentication parameters from the preferred endpoint. The fBS may proceed to verify the authentication parameters at state 524. In some embodiments, this may include verifying a CMAC parameter transmitted by the endpoint. If the verification fails, the fBS may abort the ranging process and enter state 518. If the verification succeeds, the fBS may send a message to the endpoint and retrieve stored parameters regarding the endpoint at state 525. The message may include authentication parameters such as a CMAC parameter and may be sent using a RNG-RSP message as provided by the IEEE 802.16(e) protocol. The endpoint may receive this message state 434 and may verify the authentication codes at state 436. If the endpoint is unable to verify the message or the authentication parameter (such as a CMAC parameter), the endpoint may proceed to state 432 where it may attempt to enter a regular ranging session with the fBS where it does not attempt to be treated as a preferred endpoint. In some embodiments, it may retry sending a set of ranging codes to be treated as preferred instead of entering the regular ranging session. If the endpoint is able to verify the message and/or the parameter(s), it may retrieve stored parameters of the fBS at step 437 and proceed to operational state 438 while the fBS enters operational state 526 and enter the network.

The embodiments described above with respect to FIGS. 4 and 5 may illustrate how a network entrance procedure may be enhanced. Furthermore, after having recognized the endpoint as preferred, in some embodiments, the fBS may retrieve stored information regarding the endpoint during a previous communication session. During the previous communication session, the endpoint may request that the fBS cache the parameters. Such a request may, in some embodiments, be transmitted using a REG-REQ type message provided by the IEEE 802.16(e) protocol. In response, the fBS may save information about the endpoint such as capability information, configurations of the default service flow, and identification information, such as the endpoint's STID. After saving the information, the fBS may respond with a message confirming the caching of the parameters which may cause the endpoint to similarly save information regarding the fBS. The fBS may use a REG-RSP type message provided by the IEEE 802.16(e) protocol. This may allow for one or more steps of a regular network entrance procedure to be skipped. Such steps may include exchanging capability information, registration, and/or default flow setup. In some embodiments, this may be used to shorten network entrance procedures in the IEEE 802.16(e) protocol.

A theoretical analysis on some embodiments of the enhanced ranging process is provided to show the practicability and feasibility of this process. To simplify the presentation, Table 1 below presents the definition of the symbols used in the analysis.

TABLE 1

Definition of the symbols used in the analysis

| Symbol | Definition | Example |
|---|---|---|
| M | Total number of endpoints, including preferred endpoints | 100 |
| m | Total number of preferred endpoints | 1~5 |
| T | Total number of ranging slots (ranging opportunities) allocated by fBS in one frame | 10 |
| N | Total number of ranging codes allocated for initial ranging | 64 |
| p | Probability of successfully ranging if no two endpoints transmitting the same ranging code at the same slot; i.e. p = Prob[success\|no collision] | 0.95 |
| K | The number of ranging slots used to transmit one set of ranging codes. We simply call it as the length of the set of ranging codes | 6 |
| $TH_1$ | The threshold of passing enhanced ranging. That is, one set of femto ranging codes is detected only if $TH_1$ ranging codes out of total K ranging codes are successfully detected. | 3 |
| $\epsilon$ | The maximum tolerated difference in TTD among the set of ranging codes transmitted in different ranging slots but from the same preferred endpoint. | |

The case of a single ranging code will first be considered. It is assumed that the ranging process fails if more than one station selects the same code transmitted in the same ranging slot. In other words, the ranging process will succeed only if no collision happens. Due to various reasons, the probability of successful ranging is not guaranteed to be one, even if no collision happens. p is used to represent the probability of successful ranging given no collision condition and p is less than 1.

For an endpoint u, the probability of successful decoding its ranging code is:

$Pr[\text{Success for user } u] =$
$\quad Pr[\text{Success} | \text{No collision}] * Pr[\text{No collision}] = p * Pr[\text{No collision}]$ $PR[\text{No collision for user } u] =$ $$\sum_{i=1}^{T} \sum_{j=1}^{N} \frac{1}{TN} \cdot \left(1 - \frac{1}{TN}\right)^{M-1} = \left(1 - \frac{1}{TN}\right)^{M-1}$$

Therefore, $Pr[\text{Success for user } u] = p_s = p \cdot \left(1 - \frac{1}{TN}\right)^{M-1}$ Next, consider that m out of M endpoints are active preferred endpoints. Each preferred endpoint sends K ranging codes over K consecutive ranging slots. The situation is equivalent to the case where there are M+(K−1)*m endpoints which send single ranging codes. Although the probability of collision is increased due to more ranging codes are sent during one frame, it is shown below that the increased probability is minor.

Figure 6:
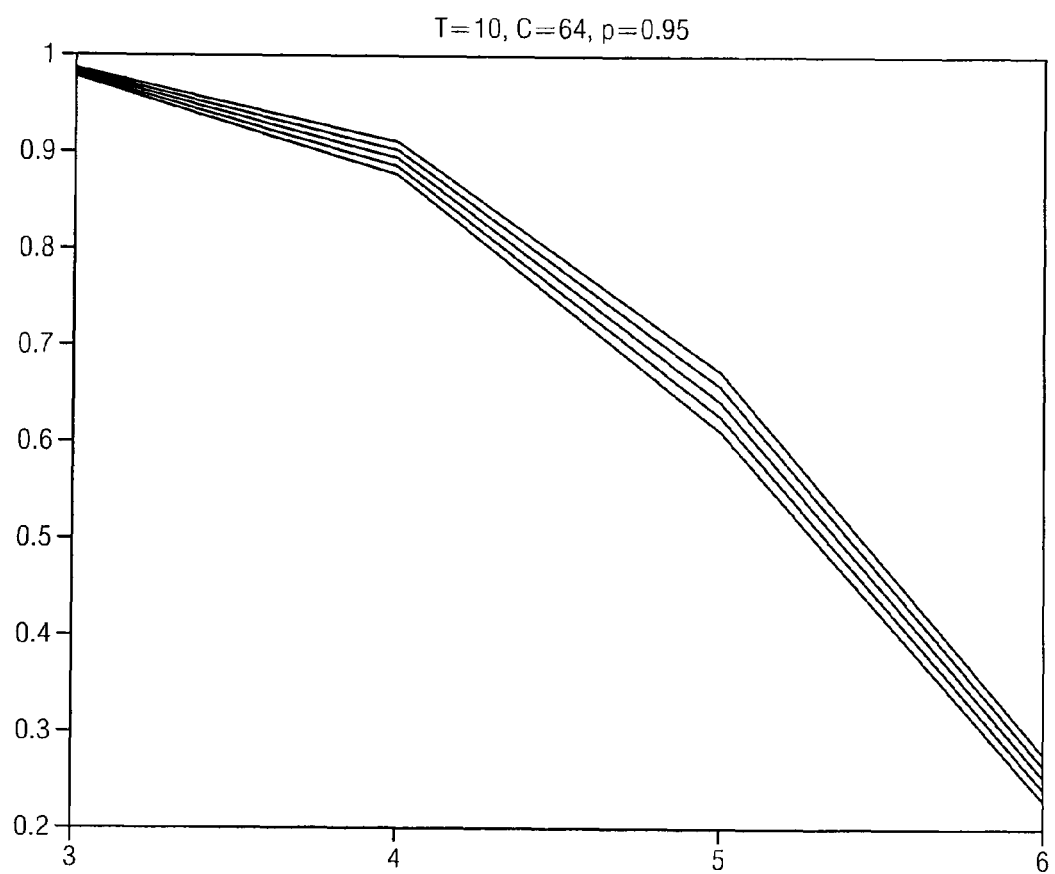
FIG. 6 is a graph illustrating one embodiment of the likelihood of successful ranging.

The probability that a set of ranging codes if $TH_1$ ranging codes out of total K ranging codes are successfully detected is:

$Pr[\text{Successful detection of set of ranging codes for user } u] =$ $Pr[\text{successful ranging codes} \geq TH_1] = P_{fs} = \sum_{i=TH_1}^{K} \binom{K}{i} \cdot p_s^i \cdot (1 - p_s^i)^{K-i}$ where $p_s = p \cdot \left(1 - \frac{1}{TN}\right)^{M+(K-1)*m-1}$ If the parameters are properly selected, the probability of successfully detecting a set of ranging codes is much higher than detecting a single ranging code. The values of the parameters used in the analysis result shown in FIG. 6 are listed in the right column of Table 1. The x-axis shows the values of $TH_1$ and the y-axis represents the probability of successfully detecting one set of ranging codes from a user, $P_{fs}$. When $TH_1=3$ and m=5, $P_{fs}=0.9771$ which is much higher than the probability of successfully detecting a single ranging code, $P_s=0.8074$ in the case of M=100.

On the other hand, the probability of falsely detecting a set of ranging codes sent by multiple different endpoints can be considered as follows (the consistency of TTD is not considered here—thus the analysis is conservative because only step 2 of the post-processing is considered):

Pr[Falsely detecting a set of femto ranging code]

$P_{fa} \approx m \cdot \frac{\binom{K}{TH_1} \cdot N^{K-TH_1}}{N^k} = \frac{m \cdot \binom{K}{TH_1}}{N^{TH_1}}$ When $TH_1=3$ and m=5, $P_{fa}=3.815*10^{-4}$. When $TH_1=4$ and m=5, $P_{fa}=4.470*10^{-6}$.

Figure 7A:
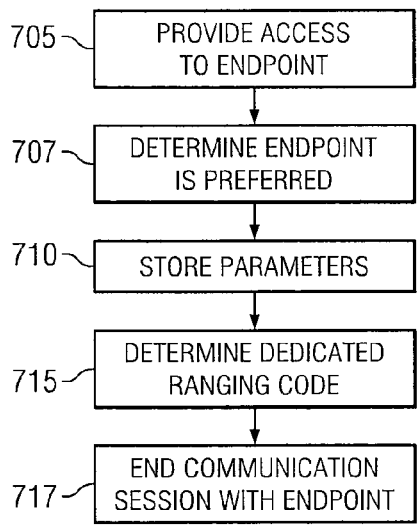
FIGS. 7A and 7B illustrate a flowchart depicting one embodiment of an enhanced network ranging procedure using dedicated ranging codes.
Figure 7B:
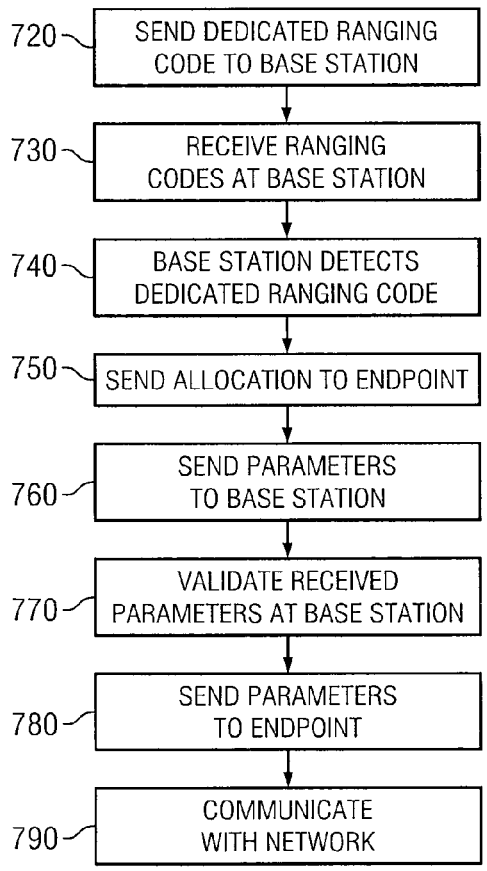

FIGS. 7A and 7B illustrate a flowchart depicting one embodiment of an enhanced network ranging procedure using dedicated ranging codes. In general, the steps illustrated in FIGS. 7A and 7B may be combined, modified, or deleted where appropriate, and additional steps may also be added to the example operation. Furthermore, the described steps may be performed in any suitable order.

Referring to FIG. 7A, at step 705, in some embodiments, an fBS may provide an endpoint access to a network. During this communication session, the endpoint may be recognized as a preferred endpoint, such as in step 707. This may occur in response to: a message sent by the endpoint to the fBS requesting a preferred status; a setting established in the fBS during or after installation; and/or a message received at the fBS from the network requesting that the fBS treat the endpoint as preferred. Parameters used in establishing the communication session of step 705 may be stored at the fBS and at the endpoint at step 710 in response to the endpoint being recognized as preferred. The parameters may include communication parameters used to authenticate and/or facilitate the communication session. The parameters may indicate the capabilities of the endpoint and/or the fBS. The stored parameters may also include the parameters of the default connections established when the endpoint is connected to the fBS. The stored parameters may also include identification parameters. For example, the endpoint may store a MAC address and a CMAC TLV parameter regarding the fBS while the fBS may store similar information regarding the endpoint. Other information exchanged during a network entrance procedure may also be stored by the endpoint and/or the fBS. This may occur in response to the endpoint requesting that the fBS treat the endpoint as a preferred endpoint. In some embodiments, when the fBS and the endpoint would like to enter into another communication session where the fBS provides the endpoint with access to the network after the current communication session, they may utilize the stored parameters to enter the communication session faster, as further discussed below.

At step 715, in some embodiments, the fBS and/or the endpoint may determine a ranging code to be used during a subsequent communication session. This may be in response to determining that the endpoint should be treated as a preferred endpoint by the fBS. The ranging code may be a specialized or dedicated ranging code used to provide an enhanced network entrance procedure to a preferred endpoint. The fBS may be configured to dedicate one or more ranging codes for use by preferred endpoints. In some embodiments, the fBS may select one of these dedicated ranging codes to be used by the endpoint in a subsequent communication session in order to treat the endpoint as preferred in accordance with the determination that occurred at step 707 and transmit this determination to the endpoint.

After the communication session that was initiated at step 705 has ended, such as at step 717, the endpoint may seek to establish a new communication session with the fBS wherein the endpoint would like to be treated as a preferred endpoint, as illustrated in FIG. 7B. To accomplish this, in some embodiments, a dedicated ranging code may be selected by the endpoint based on the determination at step 715 of the method of FIG. 7A and transmitted to the fBS at step 720 of the method of FIG. 7B.

At step 730, in some embodiments, the fBS may analyze received signals that may represent ranging codes in ranging slots transmitted from one or more endpoints. The fBS may determine which, if any, ranging codes have been received.

This detection may occur using correlators where a correlation value is determined as an output of the correlator and a match is determined if the correlation value exceeds a threshold. Embodiments discussed with respect to FIGS. 2-3 may be used to accomplish this step.

At step 740, in some embodiments, the fBS may analyze the detected ranging codes to determine if they contain a specialized (or dedicated) ranging code sent from a preferred endpoint. If the fBS determines that the set of received ranging codes does not contain a dedicated ranging code, the fBS may proceed to engage in a normal ranging session that does not treat any of the endpoints as preferred. If the fBS determines that the set of received ranging codes contains a dedicated or specialized ranging code, the fBS may recognize that a preferred endpoint is attempting to gain access to the network and may proceed to step 750.

At step 750, in some embodiments, the fBS may send an allocation message to the endpoint that sent the dedicated ranging code detected at step 740. The fBS may, in some embodiments, send the allocation message to the endpoint in a manner that gives greater priority to this endpoint than other endpoints. For example, the fBS may send the allocation to the endpoint that sent the dedicated ranging code before sending an allocation message to any other endpoints. As another example, the fBS may prioritize the endpoint that sent the dedicated ranging code over other endpoints by ensuring that the endpoint that sent the dedicated ranging code will receive an allocation message during the current ranging session. In some embodiments, the allocation message may differ from an allocation message sent to an endpoint that sent in a normal ranging code (that is, a ranging code that is not dedicated or specialized). One difference, in various embodiments, that may be present in the allocation message sent at step 750 is that the amount of bandwidth allocated to the endpoint may be larger than normal to allow the endpoint to send identification and/or authorization information to the fBS. At step 760, in some embodiments, the endpoint may send such identification and/or authorization information to the fBS in response to receiving the allocation message sent at step 750. Examples of information sent at step 760 include identification parameters (such as a MAC address or a STID (Station ID) TLV) and/or authentication parameters (such as a CMAC TLV). Such information may be sent using a RNG-REQ message of the IEEE 802.16(e) protocol.

At step 770, the fBS may validate the identification and/or authorization information sent from the endpoint at step 760. For example, the fBS may use the identification information (such as a MAC address or a STID TLV) to ascertain whether the endpoint is a preferred endpoint. In some embodiments, the fBS may also analyze authentication information sent by the endpoint at step 760. The authentication information may be unique to the endpoint. The authentication information may be dynamically generated. In some embodiments, the fBS may use the identification information in order to evaluate the authentication information. For example, if the endpoint sent a MAC address (or a STID TLV) and a CMAC TLV, the fBS may use the MAC address to validate the sent CMAC TLV by accessing stored parameters of the endpoint using the MAC address. Other forms of identification and/or authorization may be used at steps 760 and 770 in various embodiments. If the fBS fails to validate the information sent at 760, the fBS may refuse to provide the endpoint access to the network for the current ranging session. In some embodiments, this may allow the fBS to screen endpoints that may discover and use a specialized or dedicated ranging code to gain preferred access to the network though the endpoint is not actually preferred. If the fBS successfully validates the information sent at step 760, the fBS may retrieve stored parameters regarding the endpoint to facilitate the network entrance process. This information may include the information stored at step 710.

At step 780, in some embodiments, the fBS may send identification and/or authorization information to the endpoint whose information was validated at step 770. For example, the fBS may send a MAC address (or a STID TLV) and/or a CMAC TLV. In some embodiments, this information may be sent in a RNG-RSP message of the IEEE 802.16(e) protocol. The endpoint may validate this information in a manner similar to the fBS as described in step 770. If the validation is successful, the endpoint may retrieve stored parameters regarding the fBS, such as those stored at step 710. Utilizing the retrieved stored parameters, in some embodiments, the fBS and the endpoint may complete the network entrance procedure thus allowing the endpoint to communicate with the network, as in step 790. This may allow the endpoint to enter the network faster than in a normal ranging session and network entrance procedure in that the retrieval of the stored parameters may allow the fBS and the endpoint to skip the time it would take to exchange the stored parameters.

Figure 8A:
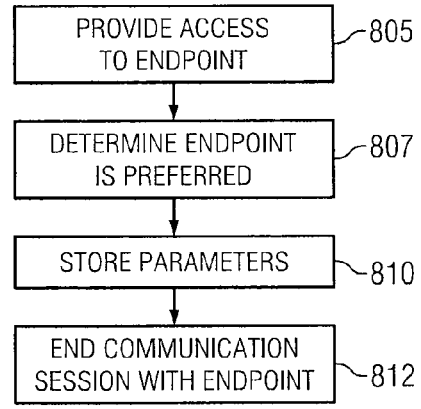
FIGS. 8A and 8B illustrate a flowchart depicting one embodiment of an enhanced network ranging procedure using regular ranging codes.
Figure 8B:
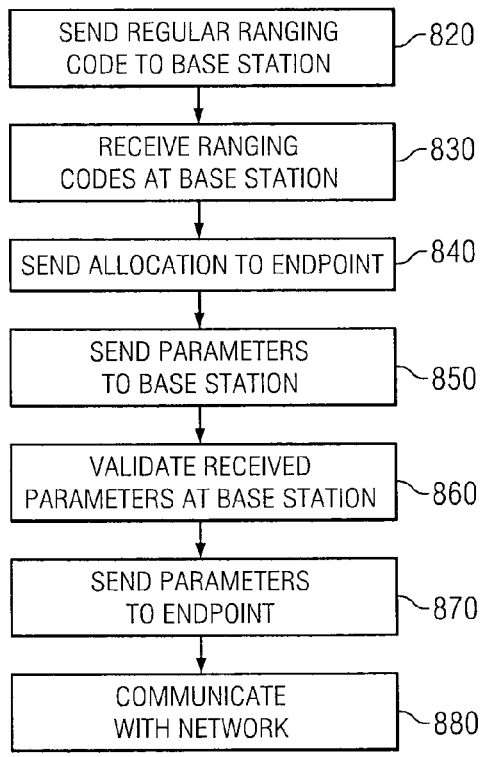

FIGS. 8A and 8B illustrate flowcharts depicting one embodiment of an enhanced network ranging procedure using regular ranging codes. In general, the steps illustrated in FIGS. 8A and 8B may be combined, modified, or deleted where appropriate, and additional steps may also be added to the example operation. Furthermore, the described steps may be performed in any suitable order.

Referring to FIG. 8A, at step 805, in some embodiments, an fBS may provide an endpoint access to a network. During this communication session, the endpoint may be recognized as a preferred endpoint, such as in step 807. This may occur in response to: a message sent by the endpoint to the fBS requesting a preferred status; a setting established in the fBS during or after installation; and/or a message received at the fBS from the network requesting that the fBS treat the endpoint as preferred. Parameters used in establishing the communication session of step 805 may be stored at the fBS and at the endpoint at step 810 in response to the endpoint being recognized as preferred. The parameters may include parameters used to authenticate and/or facilitate the communication session. The parameters may indicate the capabilities of the endpoint and/or the fBS. The stored parameters may also include identification parameters. For example, the endpoint may store a MAC address (or a STID TLV) and a CMAC TLV parameter regarding the fBS while the fBS may store similar information regarding the endpoint. Other information exchanged during a network entrance procedure may also be stored by the endpoint and/or the fBS. In some embodiments, when the fBS and the endpoint would like to enter into another communication session after the current communication session, they may utilize the stored parameters to enter the communication session faster, as further discussed below.

After the communication session that was initiated at step 805 has ended, as in step 812, the endpoint may seek to establish a new communication session with the fBS wherein the endpoint would like to be identified as preferred, as illustrated in FIG. 8B. To accomplish this, in some embodiments, a ranging code available to any endpoint may be transmitted to the fBS at step 820 of the method of FIG. 8B.

At step 830, in some embodiments, the fBS may analyze received signals that may represent ranging codes in ranging slots transmitted from one or more endpoints. The fBS may determine which, if any, ranging codes have been received. The ranging code transmitted by the endpoint in step 820 may be detected in step 830. This detection may occur using correlators where a correlation value is determined as an output of the correlator and a match is determined if the correlation value exceeds a threshold. Embodiments discussed with respect to FIGS. 2-3 may be used to accomplish this step.

At step 840, in some embodiments, the fBS may send an allocation message to the endpoint that sent the ranging code at step 820 in response to detecting the ranging code during step 830. At step 850, in some embodiments, the endpoint may send identification and/or authorization information to the fBS in response to receiving the allocation message sent at step 840. Examples of information sent at step 850 include identification parameters (such as a MAC address or a STID TLV) and/or authentication parameters (such as a CMAC TLV). Such information may be transmitted in a RNG-REQ message of the IEEE 802.16(e) protocol in some embodiments. In various embodiments, the endpoint may send a request to the fBS for more bandwidth before sending the identification and/or authorization information to the fBS. This may occur in response to the endpoint determining that the allocation given to the endpoint by the fBS at step 840 is insufficient for the endpoint to transmit the identification and/or authorization parameters. Such a request may be transmitted in a RNG-REQ message of the IEEE 802.16(e) protocol in some embodiments. In such and other embodiments, once the endpoint receives sufficient allocation, the endpoint may send the identification and/or authorization information at step 850. The fBS may provide more bandwidth by sending another allocation message to the endpoint with the new bandwidth allocation.

At step 860, the fBS may validate the identification and/or authorization information sent from the endpoint at step 850. For example, the fBS may use the identification information (such as a MAC address or a STID TLV) to ascertain whether the endpoint is a preferred endpoint. In some embodiments, the fBS may also analyze authentication information sent by the endpoint at step 850. The authentication information may be unique to the endpoint. The authentication information may be dynamically generated. In some embodiments, the fBS may use the identification information in order to evaluate the authentication information. For example, if the endpoint sent a MAC address or a STID TLV and a CMAC TLV, the fBS may use the MAC address to validate the sent CMAC TLV by accessing stored parameters of the endpoint using the MAC address. Other forms of identification and/or authorization may be used at steps 850 and 860. If the fBS fails to validate the information sent at 850, the fBS may enter into a normal ranging session with the endpoint. If the fBS successfully validates the information sent at step 850, the fBS may retrieve stored parameters regarding the endpoint to facilitate the network entrance process. This information may include the information stored at step 810.

At step 870, in some embodiments, the fBS may send identification and/or authorization information to the endpoint whose information was validated at step 860. For example, the fBS may send a MAC address (or a STID TLV) and/or a CMAC TLV. Such information may be sent using a RNG-RSP message of the IEEE 802.16(e) protocol. The endpoint may validate this information in a manner similar to the fBS as described in step 860. If the validation is successful, the endpoint may retrieve stored parameters regarding the fBS, such as those stored at step 810. Utilizing the retrieved stored parameters, in some embodiments, the fBS and the endpoint may complete the network entrance procedure thus allowing the endpoint to communicate with the network, as in step 880. This may allow the endpoint to enter the network faster than in a normal ranging session and network entrance procedure in that the retrieval of the stored parameters may allow the fBS and the endpoint to skip the time it would take to exchange the stored parameters. If the validation is unsuccessful, the endpoint may end the communication session with the fBS.

In some embodiments, the example procedures described with respect to FIGS. 8A and 8B may be employed in a variety of manners. For example, an endpoint that attempted to send in a set of ranging codes as in FIGS. 3A and 3B may utilize one or more embodiments of FIGS. 8A and 8B to enhance the endpoints network entrance procedure. For example, if the set of ranging codes was not properly identified and the endpoint merely receives an allocation message from the fBS as if the endpoint had sent only one ranging code instead of a set of ranging codes, the endpoint may proceed using steps 850-880 in order to gain the benefit of an enhanced network entrance procedure. Hence, in this example, the embodiments described in FIGS. 8A and 8B may be used as a fall-back scenario in case other forms of obtaining preferred service are not successful.

Although several embodiments have been illustrated and described in detail, it will be recognized that modifications and substitutions are possible without departing from the spirit and scope of the appended claims.

What is claimed is:

1. A method for wireless communication, comprising:
   at a base station, providing access to a network to a first endpoint;
   at the base station, sending at least one cryptographic parameter to the first endpoint;
   at the base station, receiving a plurality of ranging codes from the first endpoint, wherein the plurality of ranging codes are received after the base station has ceased providing the first endpoint access to the network;
   at the base station, determining that the plurality of received ranging codes correspond to a plurality of ranging codes of a predetermined set of ranging codes and consequently that the first endpoint has a preferred status, wherein the predetermined set of ranging codes is determined utilizing the at least one cryptographic parameter;
   at the base station, receiving at least one ranging code from a second endpoint and determining that the second endpoint does not have a preferred status in response to comparing the predetermined set of ranging codes to the at least one ranging code received from the second endpoint; and
   at the base station, providing an entrance to the network to the first endpoint in response to determining that the plurality of received ranging codes correspond to the plurality of ranging codes of the predetermined set of ranging codes, wherein providing an entrance to the network to the first endpoint comprises providing an entrance to the network to the first endpoint before determining whether to provide an entrance to the second endpoint in response to the preferred status of the first endpoint.

2. The method of claim 1, wherein:
   determining that the plurality of received ranging codes corresponds to the plurality of ranging codes of the predetermined set of ranging codes further comprises (a) determining that a time delay associated with a first received ranging code is approximately equal to a time delay associated with a second received ranging code; and providing the entrance to the network further comprises providing the entrance to the network in response to the determination in step (a).

3. The method of claim 1, wherein determining that the plurality of received ranging codes corresponds to the plurality of ranging codes of the predetermined set of ranging codes further comprises determining that ranging slots of the plurality of received ranging codes correspond to the ranging slots of the plurality of ranging codes of the predetermined set of ranging codes.

4. The method of claim 1, wherein the at least one cryptographic parameter comprises at least one cryptographically secure pseudorandom number generator credential.

5. The method of claim 1, further comprising:
storing one or more parameters of the first endpoint before receiving the plurality of ranging codes from the first endpoint; and
in response to determining that the plurality of received ranging codes correspond to the plurality of ranging codes of the predetermined set of ranging codes, utilizing the one or more parameters to decrease the amount of time it takes for the first endpoint to enter the network.

6. A method for wireless communication, comprising:
at a preferred endpoint, participating in a communication session with a base station that provides the preferred endpoint access to a network;
at the preferred endpoint, receiving at least one cryptographic parameter from the base station during the communication session;
at the preferred endpoint, generating a set of ranging codes and a set of ranging slots using the at least one cryptographic parameter after ending the communication session with the base station;
at the preferred endpoint, sending the set of ranging codes in the set of ranging slots to the base station;
at the preferred endpoint, receiving preferred access to enter the network from the base station in response to sending the set of ranging codes; and
at the preferred endpoint, entering the network through the base station.

7. The method of claim 6, wherein the at least one cryptographic parameter comprises at least one cryptographically secure pseudorandom number generator credential.

8. The method of claim 6, further comprising:
at the preferred endpoint, storing one or more parameters of the base station before ending the communication session with the base station; and
in response to receiving preferred access to enter the network from the base station, utilizing the one or more parameters to decrease the amount of time it takes for the preferred endpoint to enter the network.

9. The method of claim 6, further comprising:
generating a random number utilizing the cryptographic parameter; and
wherein generating the set of ranging codes comprises generating each ranging code of the set of ranging codes utilizing a different portion of the random number.

10. A system for wireless communication, comprising:
a radio operable to:
provide a first endpoint access to a network;
send at least one cryptographic parameter to the first endpoint; and
receive a plurality of ranging codes from the first endpoint, wherein the plurality of ranging codes are received after the base station has ceased providing access to the network to the first endpoint; and
receive at least one ranging code from a second endpoint; and
one or more processors operable to:
determine that the plurality of received ranging codes correspond to a plurality of ranging codes of a predetermined set of ranging codes and consequently that the first endpoint has a preferred status, wherein the predetermined set of ranging codes is determined utilizing the at least one cryptographic parameter;
determine that the second endpoint does not have a preferred status in response to comparing the predetermined set of ranging codes to the at least one ranging code received from the second endpoint; and
provide an entrance to the network to the first endpoint in response to determining that the plurality of received ranging codes correspond to the plurality of ranging codes of the predetermined set of ranging codes, wherein providing an entrance to the network to the first endpoint comprises providing an entrance to the network to the first endpoint before determining whether to provide an entrance to the second endpoint in response to the preferred status of the first endpoint.

11. The system of claim 10, wherein:
determining that the plurality of received ranging codes corresponds to the plurality of ranging codes of the predetermined set of ranging codes further comprises (a) determining that a time delay associated with a first received ranging code is approximately equal to a time delay associated with a second received ranging code; and
providing the entrance to the network further comprises providing the entrance to the network in response to the determination in step (a).

12. The system of claim 10, wherein determining that the plurality of received ranging codes corresponds to the plurality of ranging codes of the predetermined set of ranging codes further comprises determining that ranging slots of the plurality of received ranging codes correspond to the ranging slots of the plurality of ranging codes of the predetermined set of ranging codes.

13. The system of claim 10, wherein the at least one cryptographic parameter comprises at least one cryptographically secure pseudorandom number generator credential.

14. The system of claim 10, wherein the one or more processors are further operable to:
store one or more parameters of the first endpoint before receiving the plurality of ranging codes from the first endpoint; and
in response to determining that the plurality of received ranging codes correspond to the plurality of ranging codes of the predetermined set of ranging codes, utilize the one or more parameters to decrease the amount of time it takes for the first endpoint to enter the network.

15. A system for wireless communication, comprising:
a radio operable to:
participate in a communication session with a base station that provides access to a network; and
receive at least one cryptographic parameter from the base station during the communication session; and
one or more processors operable to:
generate a set of ranging codes and a set of ranging slots using the at least one cryptographic parameter after ending the communication session with the base station;
send the set of ranging codes in the set of ranging slots to the base station;

receive preferred access to enter the network from the base station in response to sending the set of ranging codes; and enter the network through the base station.

16. The system of claim 15, wherein the at least one cryptographic parameter comprises at least one cryptographically secure pseudorandom number generator credential.

17. The system of claim 15, wherein the one or more processors are further operable to:

store one or more parameters of the base station before ending the communication session with the base station; and in response to receiving preferred access to enter the network from the base station, utilize the one or more parameters to decrease the amount of time it takes for the preferred endpoint to enter the network.

18. The system of claim 15, wherein the one or more processors are further operable to:

generate a random number utilizing the cryptographic parameter; and wherein generating the set of ranging codes comprises generating each ranging code of the set of ranging codes utilizing a different portion of the random number.

* * * * *